Aug. 2, 1938.  P. WEEKS  2,125,531
TRACTOR
Filed June 11, 1935  2 Sheets-Sheet 1

INVENTOR
*Paul Weeks*
BY *Charles M. Fryer*
ATTORNEY

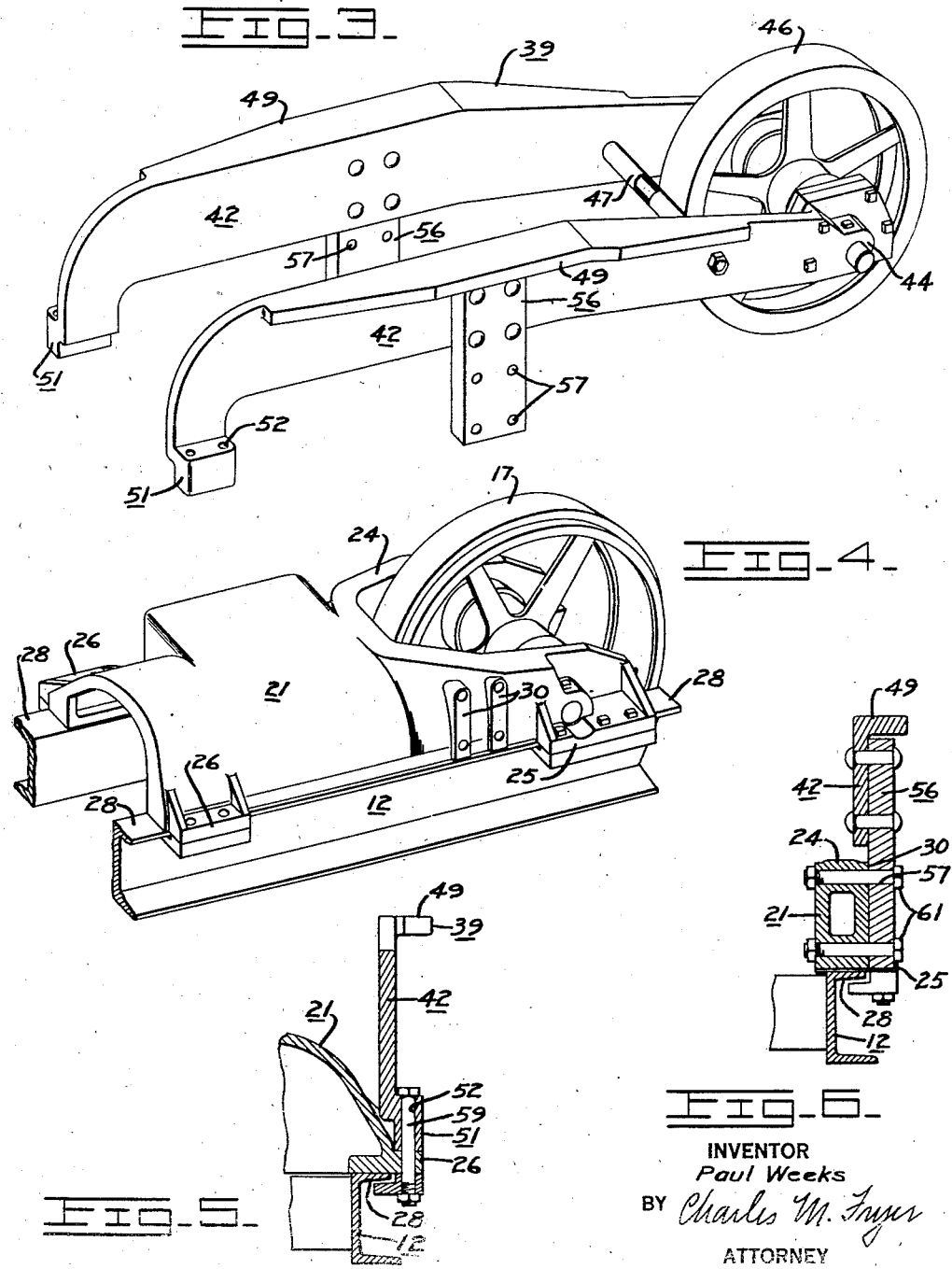

Patented Aug. 2, 1938

2,125,531

UNITED STATES PATENT OFFICE 2,125,531

TRACTOR

Paul Weeks, Washington, D. C., assignor to Caterpillar Tractor Co., San Leandro, Calif., a corporation of California Application June 11, 1935, Serial No. 26,064

20 Claims. (Cl. 305—8)

The present invention relates to track-type tractors and particularly to an adapter unit for converting a model of track-type tractor adapted to be employed in ordinary operations in the field of construction and roadwork, logging and agriculture into a tractor for warfare purposes, or other purposes requiring an increased length of track and a variation in the front angle of approach.

The present type of track-type tractor is fully capable of overcoming obstacles in every-day road usage. However, a track-type tractor is not generally designed to meet all the conditions it may continuously encounter where it is adapted for warfare use; for instance, conditions such as steep inclines, railroad beds, trenches and shell-holes. Ordinarily, in tractor construction, the engine and crankcase are mounted well to the fore of the tractor and project forwardly ahead of the track mechanism frames; and in travelling over rough terrain, such as a region pitted with shell-holes, the protruding front of the tractor may readily come in contact with inclined surfaces before the endless tracks have had a chance to secure traction thereon. The front of the tractor then is apt to dig into the inclined surface, thereby preventing further forward progress of the tractor. This is particularly liable to occur where a conventional tractor employed for fighting purposes is provided with armor-plate to protect the occupants and the operative parts; as the provision of this superstructure increases the weight of the machine making it more difficult for the front end of the engine to dig out of obstacles encountered by it before the endless tracks encounter such obstacles.

My invention seeks to overcome these problems, and it is, therefore, an object of the invention to provide an adapter unit for converting a track-type tractor for employment in ordinary operations into a tractor adapted for warfare purposes or other purposes requiring operation over extremely rough terrain.

Another object of the invention is to provide an adapter unit for the track frame of a track-type tractor which provides for an increase in track length and a variation in the front angle of approach, without disturbing the assembly of the tractor.

Another object of the invention is to provide an adapter unit which is economical of manufacture and which can be readily assembled on and detached from a track-type tractor employed for ordinary purposes.

Another object of the invention is to provide an adapter unit which utilizes the track tensioning and release mechanism of a track-type tractor.

Generally, the invention comprises an adapter unit for extending the track engaging surfaces beyond the front of the engine frame, and which may be supported by the track frame of a track-type tractor model adapted to be employed in ordinary operations without dismantling the front idler unit or any parts of the track mechanism other than the endless track itself; which employs the same track tensioning and release means as is normally employed for the front idler of a track-type tractor; and in which the normal ground-engaging area of the tracks is the same as in the unconverted tractor.

Other objects will appear as the description progresses.

Referring to the drawings:

Fig. 3 is a perspective view showing the adapter unit.

Fig. 4 is a perspective view showing a movably mounted front idler unit of a track-type tractor as illustrated in Fig. 1 and on which the adapter unit is to be mounted.

Fig. 5 is a sectional view of the adapter unit mounting means through line 5—5 of Fig. 2.

Fig. 6 is a sectional view of the adapter unit mounting means through line 6—6 of Fig. 2.

Figure 1:
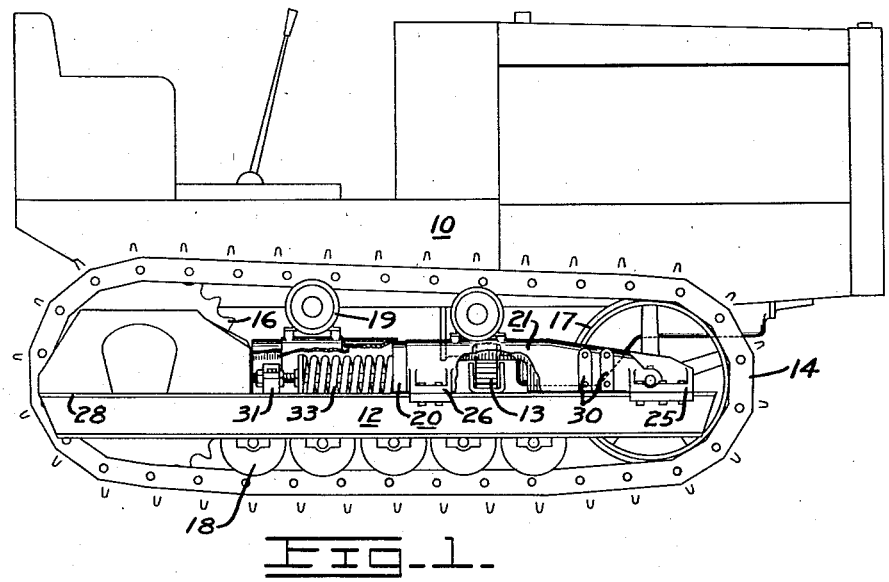
Fig. 1 is a partly diagrammatic side elevation showing a track-type tractor.

In Fig. 1 I have shown a model of track-type tractor on which the adapter unit of my invention may be mounted. This tractor includes a tractor body or main frame 10 and truck or track mechanism frames 12 one of which is provided at each side of said body or frame and is pivotally or hingedly connected thereto adjacent its rear end. The front of the tractor body rests on a transversely extending equalizer bar or spring 13 which in turn has its ends supported on the track frames. Associated with each of the track frames 12 is an endless track 14 engaging final drive sprocket wheel 16 and front idler wheel 17 movably supported on the track frame. Track rollers 18 are mounted on the under side of track frame 12 and ride on endless track 14. Rollers 19, mounted on top of the track frame, support the upper reach of the endless track.

Front idler wheel 17 has associated with it a suitable track release or recoil mechanism 20. Such track release mechanism comprises idler wheel supporting structure 21 including forked yoke 24 at the front; and having opposite front pads 25 and opposite rear pads 26 which are slidably mounted on flanges 28 of track frame 12. Intermediate the pads are bosses 30 which can be employed as a mounting station. Compressed between the supporting structure 21 and suitable adjustable spring tensioning means 31 on the track frame, is a heavy coil spring structure 33. This spring structure serves to hold the front idler against a suitable adjustable stop to position properly such idler, and also provides a safety release for the track when any obstruction gets in between the track and the front idler 17 or driving sprocket 16, by permitting the front idler and its support 21 to move back until the obstruction works itself out or is removed.

Figure 2:
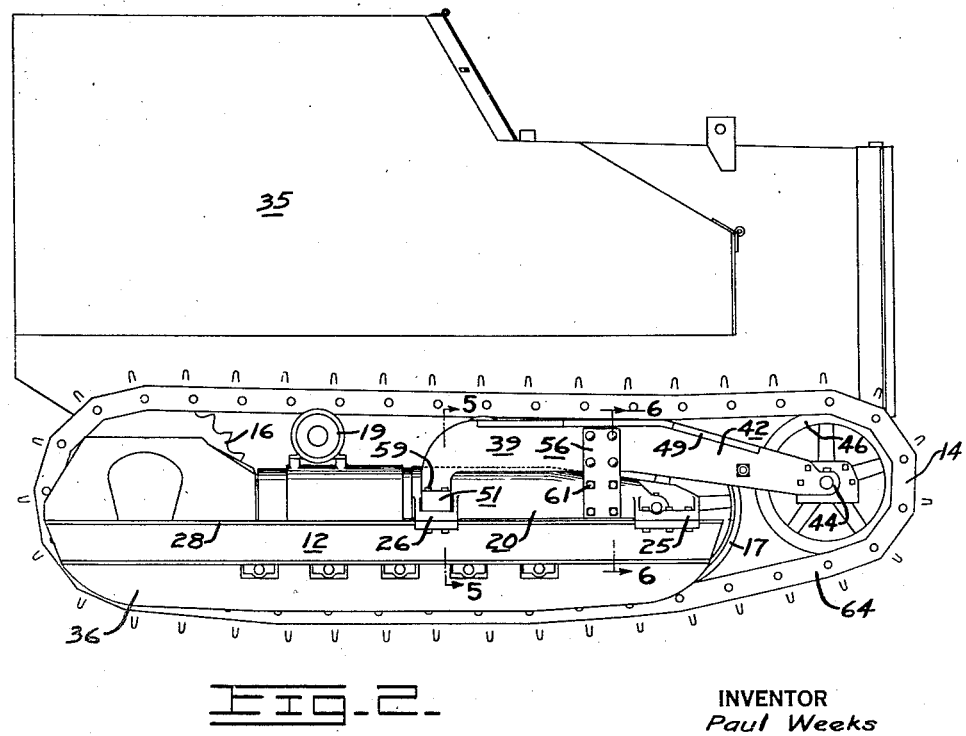
Fig. 2 is a partly diagrammatic side elevation of the tractor of Fig. 1, which has been converted to an armored tractor for warfare purposes and on which the adapter unit has been mounted.

Fig. 2 illustrates the track-type tractor such as shown in Fig. 1 converted into a war tank by the addition of a bullet-proof housing or armored superstructure 35 and by the addition of my adapter unit. The superstructure 35 is built over the body or frame of the tractor and protects the engine and radiator as well as the occupants. Protection is also provided for the track rollers 18 by means of the plate 36. As pointed out hereinbefore, when the tank having a length of track such as shown in Fig. 1 encounters a sharply inclined surface such as a trench or ditch, railroad bed, or similar obstacles apt to be met with in warfare, there is likelihood that the front or radiator end will dig into inclined surface, thereby preventing further progress of the machine. To obviate this difficulty, I have provided the attachment or track adapter unit which may be readily mounted on a track-type tractor at the time it is converted into a tank for fighting purposes without dismantling more than the endless track 14. The adapter unit may also be readily detached should it be desired to reconvert the tractor into one having the original length of track mechanism.

This attachment, as shown in Fig. 3, comprises a yoke structure 39 which is mountable on the idler wheel supporting structure 21 movably mounted on track frame 12. Yoke 39 is formed of two spaced side members 42, and at one end has bearings 44 for journalling small auxiliary idler wheel 46. Idler 46 is of less diameter than that of idler wheel 17, for a purpose to be subsequently explained, but is not so small as to cause the tracks to roll about the idler with excess angularity thereby making it difficult for the tracks to straighten themselves out. Side members 42 preferably are formed with flanged reinforcing portions 49 to increase the sturdiness of the structure. Adjacent idler wheel 46, the side members are held apart by spacer 47.

Each side member 42 is provided with a rear pad 51 having apertures 52 therein to provide for securing of the yoke 39 to idler supporting structure 21, at one location; and intermediate pad 51 and bearing 44, each side member 42 is provided with a bracket 56 riveted thereon. This bracket 56 is formed with apertures 57 for securing the yoke at another location on the idler supporting structure 21. When the adapter unit 39 is to be positioned on track frame 12 of a tractor such as shown in Fig. 1, the tracks 14 are removed and the unit placed on idler supporting structure 21, shown in detail in Fig. 4 and which, as previously explained, is movably mounted on the track frame. Pads 51 are mounted on pads 26, and secured thereto by suitable fastening bolts 59 extending through apertures in pads 26 and through the apertures 52 in pads 51. The apertures in brackets 56 are then in alinement with apertures in bosses 30; and the brackets are secured by suitable fastening bolts 61 as shown in Fig. 6. After auxiliary or adapter unit 39 is secured to supporting structure 21, the entire assembly remains free to slide on the upper flanges 28 of track frame 12; so that adapter unit 39 utilizes the same track release mechanism employed in the unconverted tractor. Thus, upon reassembly of track 14 which is necessarily increased in length, spring 33, instead of positioning front idler 17 in proper engagement with the endless track, positions auxiliary idler wheel 46 to accomplish the same result. This action takes place without any relative endwise movement between the two idler wheels 17 and 46 as these wheels are fixed with respect to each other.

By the provision of the small auxiliary idler wheel 46, it will be seen that a different front angle of approach is provided for the converted tractor than for the tractor disclosed in Fig. 1. In the construction shown in the present disclosure, the front portion of the side members 42 of adapted unit 39 is inclined downwardly and wheel 46 is of such diameter as to place the upper periphery of auxiliary idler 46 substantially in alinement with the upper periphery of idler wheel 17 and to space the lower portion of idler 46 above the lower portion of idler 17. By virtue of this arrangement and the relative difference in sizes of the idler wheels, the upper stretch of track 14 is in the same horizontal plane substantially along its entire length as it turns about idler 46. The ground contacting portion of the lower stretch of track 14 remains substantially the same in length as in the tractor of Fig. 1. However, as shown in Fig. 2, the front portion 64 of the lower stretch inclines upwardly between idlers 17 and 46 to provide the desired angle of approach. This front angle of approach may be varied, depending on the diameter of idler wheel 46 and its location with respect to the normal upper run of track 14. In this connection, it will be observed that the length of adapter unit 39 is such as to position the front of idler 46 ahead of the front of the body of the machine, so as to enable the endless tracks rather than the front of the tractor to encounter obstacles first.

Because the same normal ground-engaging area of the tracks as employed and as has been found to be the most satisfactory in a track-type tractor of any given character is retained in the converted tractor, there will be no difficulty in steering the converted tractor. The increased length of track with its front angle of approach comes into use only when an obstacle, such as a ditch, is encountered; and as soon as the remaining lower track section rests upon a substantially even surface, the increased length of track ceases to contact the ground or support the weight of the tractor, functioning again only when another obstacle is encountered. The provision of this type of track contour also alleviates pitching which occurs when a tractor goes over rough terrain, as the tractor, by the provision of the slanting front angle of approach, is able to mount inclined surfaces at a gradual angle. Also, because of the simplicity of the fastening means, the adapter unit may be readily removed from the tractor should it be desired to effect reconversion into a tractor having the original length of track.

Obviously, should one desire to manufacture directly the completed structure of my invention from the track mechanism parts primarily designed to produce the tractor of Fig. 1, then this can be readily done prior to assembly of the track 14 per se, by mounting the auxiliary idler structure 39 of Fig. 3 on the regular idler structure 21 of Fig. 4 and initially assembling an increased length of track on the machine.

I therefore claim as my invention:

1. An adapter for enabling a track-type tractor having a tractor body and a track frame hingedly connected to said body to employ an increased length of endless track, comprising an auxiliary structure having means enabling support thereof by said track frame, and an idler wheel supported by said auxiliary structure in a position so as to be in alinement with said track frame for accommodating said increased length of endless track to such tractor.

2. An adapter for enabling a track-type tractor having a track frame and an idler wheel supporting structure movably supported by said frame to employ an increased length of endless track, comprising an auxiliary structure having means for attachment to said idler wheel supporting structure for movement therewith, and an idler wheel supported by said auxiliary structure.

3. An adapter for enabling a track-type tractor having a tractor body and a track frame hingedly connected to said body to employ an increased length of endless track, comprising an auxiliary structure having means enabling support thereof by said track frame and having means thereon in a position so as to be in alinement with said track frame for accommodating said increased length of endless track to such tractor.

4. An adapter for enabling a track-type tractor having a track frame and an idler wheel supporting structure movably supported by said frame to employ an increased length of endless track, comprising a yoke structure having an idler wheel adjacent one end thereof, means adjacent the other end of said yoke structure for attachment to said idler wheel supporting structure, and additional means intermediate said ends for attachment to said idler wheel supporting structure.

5. In a track-type tractor having a track frame; an idler wheel supporting structure movably supported by said track frame; an idler wheel supported by said structure and normally adapted to form part of a track mechanism including an endless track of a given length; means enabling said tractor to employ an increased length of track comprising an adapter structure supported by said idler wheel supporting structure with a portion thereof projecting in front of said idler wheel to engage said increased length of track.

6. In a track-type tractor having a track frame; an idler wheel supporting structure movably supported by said track frame; an idler wheel supported by said structure and normally adapted to form part of a track mechanism including an endless track of a given length; means enabling said tractor to employ an increased length of track comprising an adapter structure supported by said idler wheel supporting structure with a portion thereof projecting in front of said idler wheel to engage said increased length of track; and recoil mechanism common to both said idler wheel supporting structure and said adapter structure.

7. In a track-type tractor having a tractor body; a track frame; a driving wheel adjacent one end portion of said track frame; an idler wheel supporting structure movably mounted adjacent the opposite end portion of said track frame; an idler wheel supported by said structure and normally adapted together with said driving wheel to form part of a track mechanism including an endless track of a given length; and means enabling said tractor to employ an increased length of track extending adjacent an end of said tractor body comprising an adapter structure supported by said idler wheel supporting structure with a portion thereof projecting to a position adjacent said end of said tractor body to engage said increased length of track.

8. In a track-type tractor; a tractor body; a track frame hingedly connected at one end to said body; an idler wheel supported by said track frame and normally adapted to form part of a track mechanism including an endless track of a given length; and means enabling said tractor to employ an increased length of continuous track for operation of the tractor over rough terrain comprising an adapter structure supported by said track frame at an end opposite to said hinged connection and having an idler wheel of less diameter than said first mentioned idler wheel in alinement with said first mentioned idler wheel, the idler wheels being so positioned with respect to each other as to provide said increased length of track with an under reach having an upward inclination between said idler wheels.

9. In a track-type tractor having a tractor body; a track frame hingedly connected to said body; an idler wheel supported by said track frame and normally adapted to form part of a track mechanism including an endless track of a given length; and means enabling said tractor to employ an increased length of continuous track extending adjacent an end of said tractor body comprising an adapter structure supported by said track frame and having an idler wheel of less diameter than and in alinement with said first mentioned idler wheel positioned adjacent said end of said tractor body to accommodate said increased length of continuous track to said tractor, the idler wheels being so positioned with respect to each other as to provide said increased length of continuous track with an under reach having an upward inclination between said idler wheels.

10. In a track-type tractor; a tractor body; a track frame hingedly connected to said body; an idler wheel supported by said track frame and normally adapted to form part of a track mechanism including an endless track of a given length having a normal ground contacting run of a given length when said tractor is on substantially even ground; and means enabling said tractor to employ an increased length of continuous track comprising an adapter structure supported by said frame with a portion thereof projecting in front of said idler wheel in alinement therewith to engage said increased length of track, said adapter structure serving to position the under-reach of said increased length of track out of contact with the ground when the tractor is on substantially even ground whereby said normal ground contacting run of said track remains at said given length.

11. In a track-type tractor; a tractor body; a track frame hingedly connected to said body; an idler wheel supported by said track frame and normally adapted to form part of a track mechanism including an endless track of a given length; and means enabling said tractor to employ an increased length of continuous track without removal of said idler wheel comprising an adapter structure supported by said track frame and having a portion thereof projecting in front of said idler wheel in alinement therewith to engage said increased length of track.

12. An adapter for enabling a track-type tractor having a tractor body and a track frame hingedly connected at one end to said body to employ an increased length of endless track comprising an auxiliary structure having means enabling support by said track frame at an end opposite to said hinged connection, and a wheel on said structure in a position so as to be in alinement with said track frame for engaging the increased length of track.

13. In a track-type tractor having an original track mechanism including a track frame and designed for substantially smooth surface operation, means for converting said tractor for operation over rougher ground, said means being carried by said track frame and comprising an idler supported ahead of said original track mechanism, a continuous track assembled on said track mechanism extending over said idler, said idler being positioned sufficiently above ground to suspend at an inclination above ground, a portion of said continuous track leading to said idler.

14. An adapter for extending the track of a track-type tractor comprising a pair of spaced members, a shaft interconnecting said members at one end thereof, an idler wheel mounted on said shaft, and means at the other end of each of said members and at an intermediate point thereof for attachment of said adapter to the track mechanism of said track-type tractor.

15. A track-type tractor comprising a frame for supporting track mechanism, an idler movably supported with respect to said frame, recoil mechanism for said idler, a track extending idler mounted in cooperative engagement with said same recoil mechanism, and a track extending over said track extending idler.

16. A track-type tractor comprising a frame for supporting track mechanism, an idler movably supported with respect to said frame, recoil mechanism for said idler, a track extending idler connected for movement with said first idler in cooperative relation with said same recoil mechanism, and a track extending over said track extending idler.

17. In a track-type tractor; a tractor body; a track frame hingedly connected at one end to said body; an idler wheel supported by said track frame and normally adapted to accommodate an endless track of a given length; and means enabling said tractor to employ an increased length of continuous track for operation of the tractor over rough terrain comprising an auxiliary adapter structure supported by said track frame at an end opposite to said hinged connection and having an idler wheel thereon positioned in alinement with said first mentioned idler wheel for engaging the increased length of track and enabling the same to be continuous, said second mentioned idler wheel being also positioned with respect to said first mentioned idler wheel as to provide said increased length of track with an upper reach partly supported by said first mentioned idler wheel.

18. In a track-type tractor; a tractor body; a track frame hingedly connected at one end to said body; an idler wheel supported by said track frame and normally adapted to accommodate an endless track of a given length; and means enabling said tractor to employ an increased length of continuous track for operation of the tractor over rough terrain comprising an auxiliary adapter structure supported by said track frame at an end opposite to said hinged connection and having an idler wheel thereon positioned in alinement with said first mentioned idler wheel for engaging the increased length of track and enabling the same to be continuous, said second mentioned idler wheel being of less diameter than said first mentioned idler wheel and also positioned with respect thereto so as to provide said increased length of continuous track with an upper reach partly supported by said first mentioned idler and an under reach having an upward inclination between said idler wheels.

19. In a track-type tractor; a track frame having an idler wheel supported thereby and normally adapted to accommodate an endless track of given length; a tractor body hingedly connected to said track frame adjacent one end thereof and projecting at its opposite end a substantial distance beyond said track frame; and means enabling said tractor to employ about said track frame a continuous track of a length greater than said given length and extending past the idler wheel along the projecting portion of said body comprising an adapter structure supported by said track frame and extending toward the projecting end of said body, said adapter structure having an idler wheel thereon positioned in alinement with said first mentioned idler wheel.

20. In a track-type tractor; a track frame having an idler wheel supported thereby and normally adapted to accommodate an endless track of given length; a tractor body hingedly connected to said track frame adjacent an end thereof and projecting at its opposite end a substantial distance beyond said track frame; and means enabling said tractor to employ about said track frame a continuous track of length greater than said given length and extending past the idler wheel along the projecting portion of said body comprising an adapter structure supported by said track frame and extending toward the projecting end of said body, said adapter structure having an idler wheel thereon positioned in alinement with said first mentioned idler for engaging said track of greater length, said second mentioned idler wheel being of less diameter than said first mentioned idler wheel and also positioned with respect thereto to provide said continuous track with an upper reach partly supported by said first mentioned idler wheel and an under reach having an upward inclination between both said idler wheels.

PAUL WEEKS.